Figure 1:
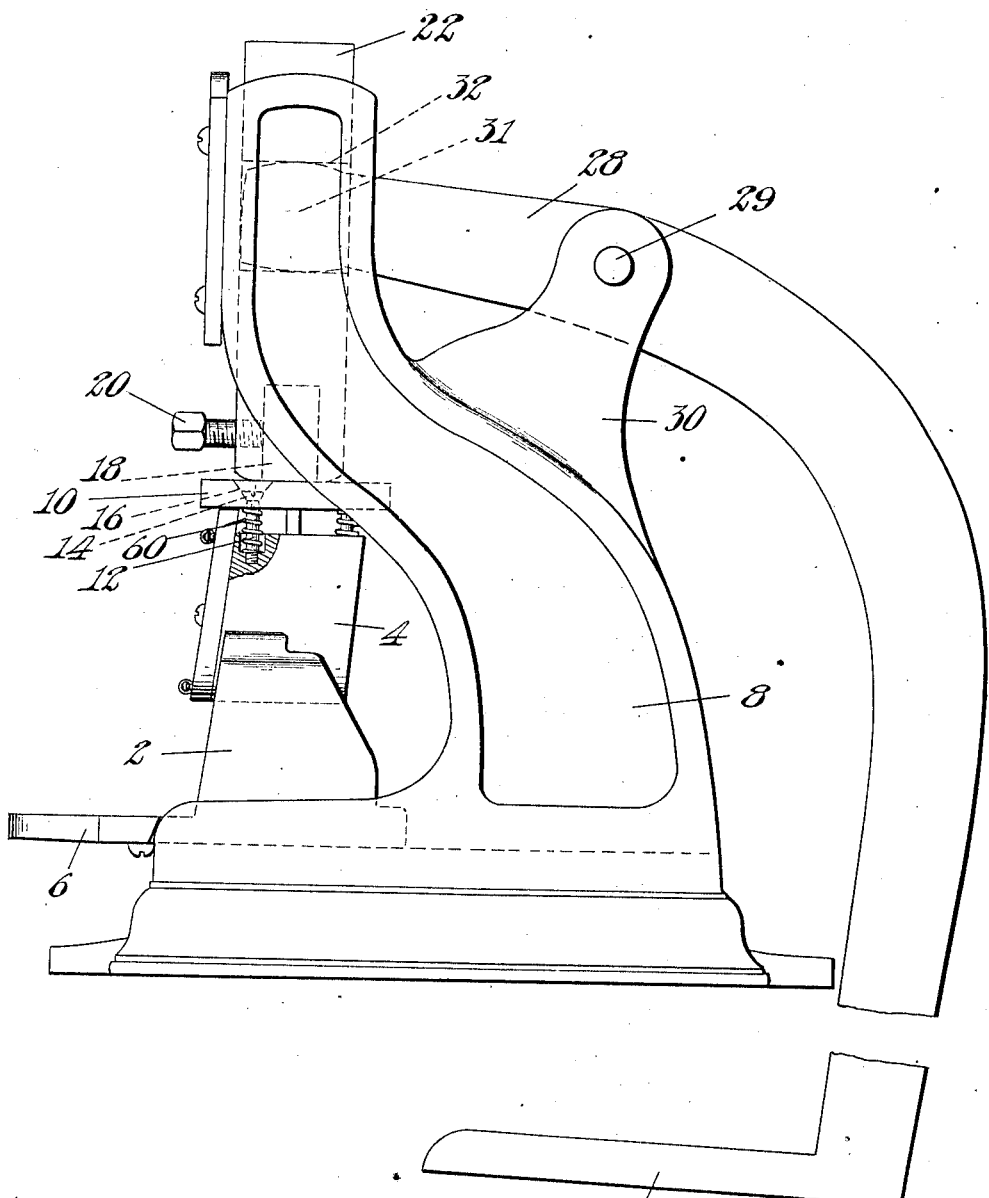

F. FLEURY.
MACHINE FOR USE IN THE MANUFACTURE OF BOOTS AND SHOES.
APPLICATION FILED FEB. 14, 1911.
1,048,514.
Patented Dec. 31, 1912.
2 SHEETS—SHEET 2.
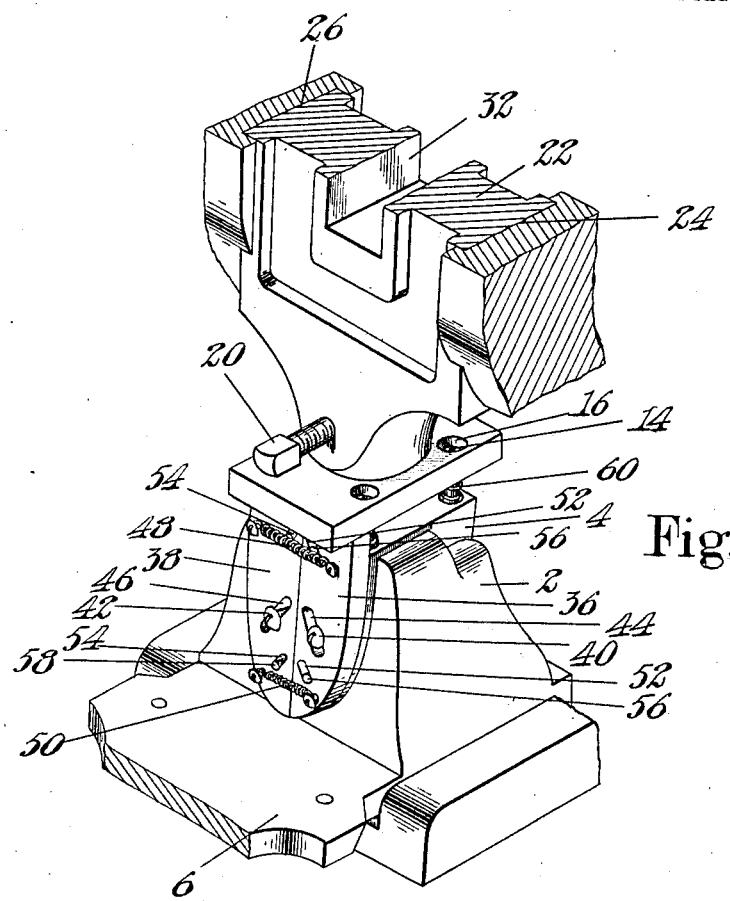
Fig. 2.
Fig. 3.
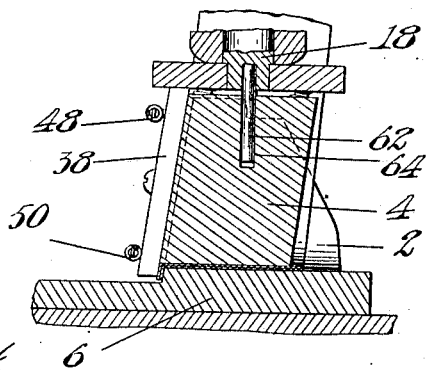
WITNESSES
Elizabeth C. Coup,
Edith C. Holbrook
INVENTOR
Frank Fleury
By his Attorney
Nelson W. Howard

UNITED STATES PATENT OFFICE.

FRANK FLEURY, OF BROOKLYN, NEW YORK, ASSIGNOR, BY MESNE ASSIGNMENTS, TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,048,514. Specification of Letters Patent. Patented Dec. 31, 1912.

Application filed February 14, 1911. Serial No. 608,500.

*To all whom it may concern:*

Be it known that I, FRANK FLEURY, a citizen of the United States, residing at Brooklyn, in the county of Kings and State of New York, have invented certain Improvements in Machines for Use in the Manufacture of Boots and Shoes, of which the following description, in connection with the accompanying drawings, is a specification, like reference characters on the drawings indicating like parts in the several figures.

This invention relates to machines for shaping or molding the uppers of boots or shoes and is herein shown as embodied in a machine for molding the heel end of a stitch down shoe upper and forming thereon an outturned flange.

An object of the invention is to provide simple and compact means for molding the heel end of a stitch down shoe upper and forming thereon an outturned flange in one continuous operation, whereby the preparation of the upper for the attachment of the sole may be effected quickly and with comparatively unskilled labor.

Other objects and features of the invention will be apparent when the following description and claims are considered in connection with the accompanying drawings, in which—

Figure 1 is a side elevation of a machine embodying the invention; Fig. 2 is a detail perspective showing the molds in operative relation to each other; Fig. 3 is a vertical section through the molds showing the position of the operative parts of the machine at the end of the molding operation.

The molding means proper comprises a female mold 2 and a male mold 4, the female mold being carried upon a plate 6 attached to the base of the frame 8 in such manner that it can readily be replaced by a mold of a different size. The male mold 4 is connected to a plate 10 by screws 12 threaded into said mold and having heads 14 resting normally in counterbored seats 16 in said plate. The plate 10 is provided with a stem 18 held by a set screw 20 in a slide 22 arranged in guideways 24 and 26 in an overhanging part of the frame 8.

The slide 22 is moved vertically by means of a treadle lever 28 pivoted at 29 in upstanding ears 30 of the frame 8, said lever having a rounded end 31 which enters an opening 32 in the slide 22. The treadle lever 28 is so shaped that its weight normally maintains the slide 22 in its uppermost position. A foot piece 34 at the lower end of said treadle lever may be engaged by the foot of the operator when it is desired to depress the slide 22 to bring the male mold 4 into coöperative relation with the female mold 2.

When the molds are in coöperative relation to each other the forward edge of the male mold 4 projects over the edge of the female mold a slight distance, the amount of the projection being substantially equal to the thickness of the material interposed between the molds. This permits the operation of a flange former which is mounted upon the male mold, said flange former being expansible and comprising plates 36 and 38 confined upon the male mold 4 for sliding movement by screws 40 and 42 passing through inclined guiding slots 44 and 46, respectively, in said plates. The plates 36 and 38 are normally maintained in engagement with each other by springs 48 and 50 connected at their respective ends to studs or screws in the respective plates.

The movements of the plates toward and away from each other are guided both by the slots 44 and 46 and by upper and lower slots 52 and 54 into which project upper and lower studs 56 and 58 upon the male mold. When the plates 36 and 38 are in engagement with each other their outer edges lie substantially flush with the outer edge of the male mold. The vertical extent of the plates 36 and 38 is, however, somewhat greater than the vertical extent of the male mold 4, so that the plates project above the upper edge of the male mold and are preferably normally in engagement with the plate 10. The plate 10 is therefore normally spaced from the male mold 4 a distance corresponding to the amount of projection of the plates 36 and 38 above the male mold, and is yieldingly kept in this spaced relation by springs 60 surrounding the screws 12, the action of the springs being aided by gravity. The slots 44, 46 and 52, 54 are so inclined to the longitudinal axis of the shoe that the operative movement of the flange former will be toward the side as well as toward the rear end of the shoe.

The operation of the machine is as follows: The parts being in the position shown in Fig. 1, a shoe upper is placed in the female mold 2 with its toe end placed behind the heel mold, providing the toe end of the upper is connected to the heel end. In placing the upper in the female mold the operator will cause the upper to project beyond the front face of the female mold a distance equal to the desired width of the flange to be formed on said upper. The operator then depresses the slide 22 to bring the male mold 4 into contact with the stock in the female mold. When the movement of the male mold is interrupted the continued depression of the slide 22 will cause the plate 10 to compress the springs 60 and to move the plates 36 and 38 downward. As above pointed out, the movements of the plates 36 and 38 will not be directly downward but will be partly to the side, owing to the action of the screws 40 and 42 and the studs 56 and 58 in the inclined slots in said plates. The plates 36 and 38 will thus be caused to engage the projecting margin of the upper and to turn it out over the edge of the female mold. When the molding and flange forming operation has been completed, the operator releases the treadle lever 28 and the weight of this lever moves the slide 22 to its uppermost position and permits the springs 60, 48 and 50 to restore the parts to the relative positions shown in Fig. 1. To guide the male mold 4 in its movements toward and from the plate 10 a pin 62, depending from the stem 18, enters an opening 64 in said male mold.

Having now described my invention, what I claim as new and desire to secure by Letters Patent of the United States is:

1. In a machine of the class described, means for molding the heel end of a shoe upper, comprising a male mold and a female mold, and means carried by said male mold and movable relatively thereto for turning out a flange upon said upper.

2. In a machine of the class described, means for molding the heel end of a shoe upper, comprising relatively movable mold members, and means carried by one of said members and movable relatively thereto at the end of the relative movement of said mold members to form an outturned flange upon said upper.

3. In a machine of the class described, means for molding the heel end of a shoe upper, comprising male and female molds, and means carried by and guided upon said male mold for turning out upon said female mold an outturned flange.

4. In a machine of the class described, means for molding the heel end of an upper, comprising a stationary female mold and a male mold movable into and out of operative relation to said female mold, and means movable with said male mold and movable relatively thereto at the end of the movement of said male mold into operative position for forming upon said upper an outturned flange.

5. In a machine of the class described, means for molding the heel end of an upper, comprising relatively movable male and female molds, and means for forming an outturned flange upon said upper, arranged with its flange engaging edge normally flush with the edge of said male mold and movable relatively to said male mold to effect the flange forming operation.

6. In a machine of the class described, means for molding the heel end of a shoe upper, comprising male and female molds, and separable plates arranged upon said male mold to engage and turn out the projecting margin of said upper.

7. In a machine of the class described, means, comprising outer and inner mold members for molding the heel end of an upper into substantially U-shape, and means carried by said molding means for forming an outturned flange on said upper, said flange forming means comprising separable members arranged normally with their outer edges flush with the outer edge of the inner mold member.

8. In a machine of the class described, means for molding the heel end of a shoe upper, comprising male and female molds relatively movable into operative relation to each other, means for effecting such relative movement, and means operated by the continued movement of said moving means for forming an outturned flange upon the molded end of said upper.

9. In a machine of the class described, means for molding the heel end of a shoe upper, comprising coöperating molds, means for effecting a relative molding movement of said molds, and means movable into engagement with the inside of the upper during the molding operation and operated by the continued movement of said moving means for forming an outturned flange upon said upper.

10. In a machine of the class described, means for molding the heel end of an upper into substantially U-shape, and expansible means arranged to expand in divergent directions oblique to the longitudinal axis of said upper to form upon said U-shaped end an outturned flange.

11. In a machine of the class described, means for molding the heel end of a shoe upper into substantially U-shape, comprising coöperating male and female molds, means for effecting a relative molding movement of said molds, and means movable into engagement with the inside of the upper during the molding operation and movable relatively to said molding means in a direction different from the direction of its initial movement for forming an outturned flange upon said upper.

12. In a machine of the class described, means for molding the heel end of a shoe upper into substantially U-shape, comprising relatively movable mold members, means for effecting a relative movement of said mold members, and flange forming means movable into engagement with the inside of the projecting margin of the upper during the relative movement of the mold members, and movable in divergent directions, after the completion of the relative movement of said mold members, for turning out upon said molding means an outturned flange.

13. In a machine of the class described, means for molding the heel end of a shoe upper arranged to leave a marginal portion thereof projecting outside said means, and expansible flange forming means arranged to expand in its flange forming operation from a position within the projecting margin.

14. In a machine of the class described, means for molding the heel end of a shoe upper arranged to leave a marginal portion thereof projecting outside said means, said means comprising a male mold and a female mold, and expansible means for forming a flange from said projecting margin arranged to expand from a position over said male mold and within said projecting margin into a position in which it turns said margin out upon the female mold.

15. In a machine of the class described, means for molding the heel end of a shoe upper arranged to leave a marginal portion thereof projecting outside said means, and expansible means for forming an outturned flange from said projecting margin comprising separable plates arranged to move during the flange forming movement in directions substantially normal to the contour of said margin.

16. In a machine of the class described, means for confining the heel end of a shoe upper along a flange turning line and expansible flange forming means arranged to expand during the flange forming operation from a position inside said line into a position overlying the outturned flange.

In testimony whereof I have signed my name to this specification in the presence of two subscribing witnesses.

FRANK FLEURY.

Witnesses:
FREDERICK HOLMES,
C. L. BIRDSALL.

Copies of this patent may be obtained for five cents each, by addressing the "Commissioner of Patents, Washington, D. C."